3,477,467
ADJUSTABLE PRESSURE REDUCING VALVE
Sewood Sewell, Concord, and Melvin F. Katzer, Danville, Calif., assignors to The Dow Chemical Company, Midland, Mich., a corporation of Delaware
Filed Oct. 5, 1967, Ser. No. 673,134
Int. Cl. F16k 11/00; F15d 1/02
U.S. Cl. 137—599                                                7 Claims

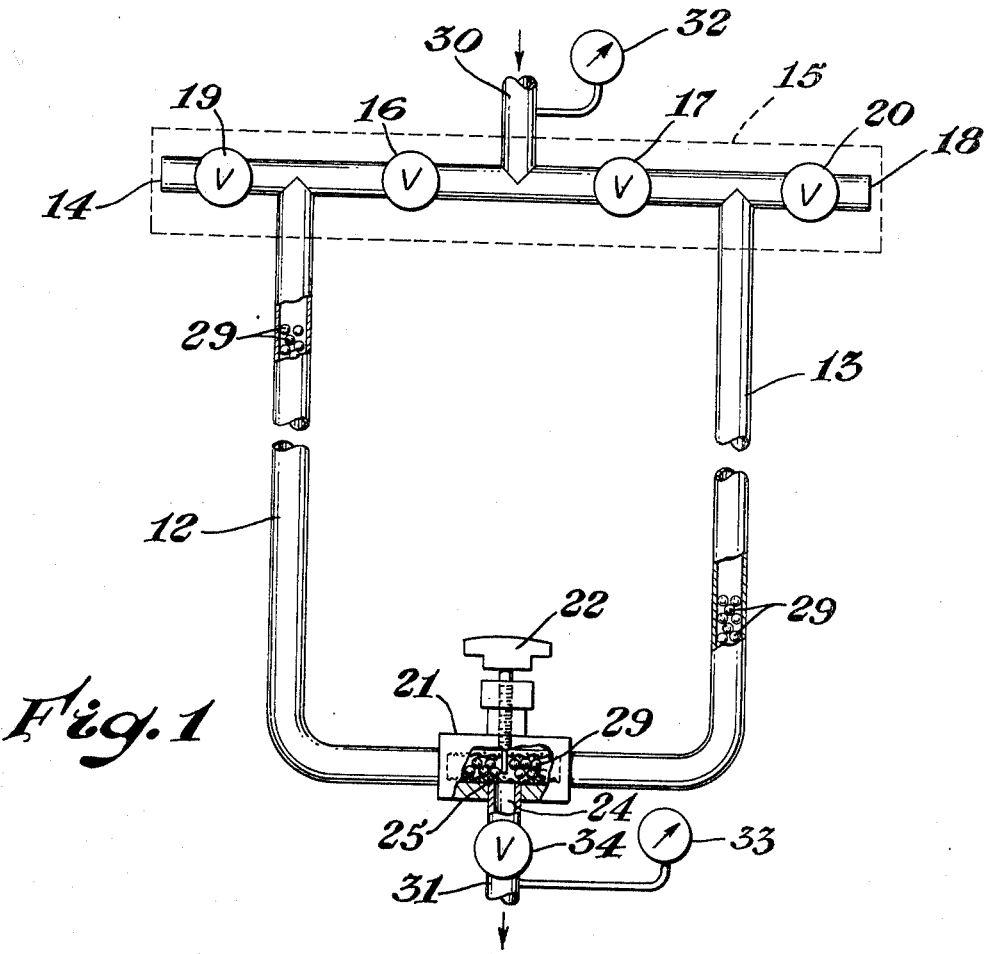
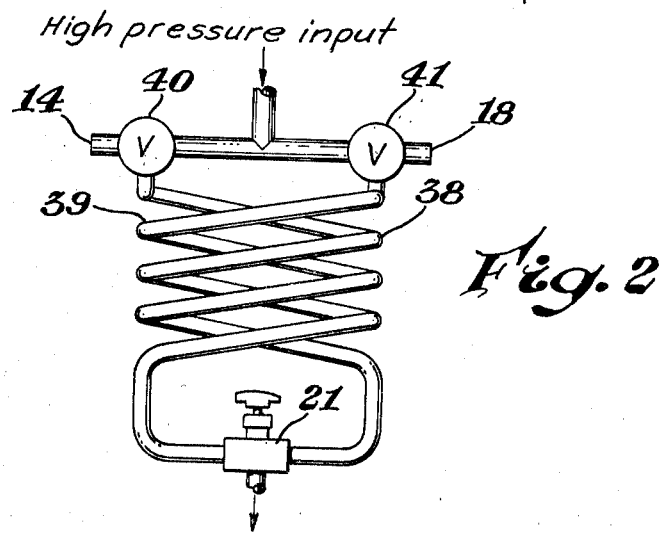

ABSTRACT OF THE DISCLOSURE

Valving apparatus is provided in which the pressure on a flowing liquid, especially liquid solutions of polymers, is reduced across a packing of displaceable solid shapes contained within at least one of a plurality of conduits interconnected in a parallel flow pattern. By operating shut-off valves on the inlets of the conduits, the solid shapes may be partially displaced into one or more of the conduits used as storage legs. The pressure drop is controlled by adjusting the length of the packing of solid shapes contained within the conduit experiencing liquid flow. Pressure drops produced in this manner subject the liquid to minimal shearing force.

---

The instant invention relates to a valving apparatus for producing a controlled pressure reduction on a flowing liquid with minimal shear. The valve is especially well adapted for reducing the pressure on liquid solutions of high polymers, which can be degraded by excessive shearing as occurs in conventional devices for the depressurization of liquids.

A need for variable liquid depressurization is found in the water distributing systems for water flooding operations in secondary oil production. The water is usually pressurized at a centralized pumping station. From a pressurized header, it is supplied at individual wells for injection at optimum pressures. Sometimes the water used in such systems will contain high molecular weight polymers.

It has been discovered that conventional depressurizing devices, such as the orifice, nozzle or adjustable valve, e.g., a gate, globe, angle, spiral or pinch valve, will induce significant shearing of liquids and thus loss of desirable properties, when the liquid pressure is decreased significantly across such devices. This shearing effect on a polymer solution is evident in the viscosity loss of the solution.

It is known that such molecular degradation of polymers can be minimized during pressure reduction by passing their solutions through a porous bed. This increases the length of the pressure reduction gradient in the direction of flow. As a consequence there is less shearing than occurs in the conventional pressure reduction devices.

In the instant invention, a novel valving apparatus and method are provided for achieving a controlled pressure reduction in flowing liquids over an extended flow path so as to avoid excessive shearing forces.

This apparatus comprises a plurality of liquid conduits connected for parallel fluid flow, at least one of which contains a packing of pressure displaceable solid shapes. The conduits are connected at their inlet to valving means for diverting liquid flow into, or bleeding liquid from, less than all of the conduits. At their outlet end, the parallel conduits are in communication through an outlet manifold capable of passing the solid shapes. The discharge passage from the outlet manifold is protected with a liquid permeable retainer for keeping the displaceable solid shapes within the communicating parallel conduits while allowing the flowing liquid to pass. At their downstream end, the conduits are equipped with gate means for blocking and unblocking the displaceable solid shapes so as to control their variable placement within the conduits. The engagement of such gate means does not block liquid flow. Preferably, each conduit has a restraining means to prevent the solid shapes from passing beyond a certain point on their upstream end.

The invention will be better understood by reference to the accompanying drawings in which:

FIGURE 1 is a schematic illustration of a valve in accordance with the invention utilizing two conduits in parallel.

FIGURE 2 illustrates a compact coil version of the valve shown in FIGURE 1.

In FIGURE 1, two conduit legs are connected in parallel for liquid flow, one to function as a flow leg 12 and the other as a storage leg 13. In each of these conduit legs is a partial packing of pressure displaceable shapes 29 in the form of solid spheres, that portion in the flow leg 12 providing resistance to liquid flow and that portion in storage leg 13 being available for adjustment of the length of packing in flow leg 12. At their inlet end, the conduit legs are connected to diverting valving means 15 for optionally diverting incoming liquid, on which pressure is to be reduced, into the flow leg 12 or into the storage leg 13, when adjustment of the pressure drop may be desired. Depending upon which leg is receiving the liquid, it can be discharged from the other through bleeder vent 14 or 18 to effect changes in the length of packing. The particular valving means 15 illustrated includes liquid on-off valves 16 and 17. Also provided are bleeder valves 19 and 20 which discharge liquid through bleeder vents 14 and 18, respectively.

The conduit legs 12 and 13 communicate through a discharge manifold 21. Protecting the outlet 24 of this manifold 21 is a retaining screen 25 to retain the pressure displaceable shapes 29 within the conduit legs 12 and 13. In the outlet manifold 21 is an adjustable gate means 22 in the form of a screw-adjustable gate, which, when rotated, blocks or unblocks the displacement of the pressure displaceable shapes 29 from one to another of the conduit legs 12 and 13. On the inlet line 30 and outlet line 31 are pressure gauges 32 and 33 to measure the pressure drop across the valve and in the outlet line 31 is an on-off valve 34.

In operation, liquid to be depressurized flows into the diverting valving means 15 through inlet line 30. To fully displace the solid shapes 29 into the flow leg 12, the on-off liquid valve 16 and bleeder valve 20 are closed and the on-off liquid valve 17 and bleeder valve 19 are opened. The gate means 22 is also open. Preferably, but only optionally, the valve 34 on outlet line 31 is closed. In this manner, the flow leg 12 is filled with the displaceable solid shapes 29 as the result of liquid pressure in line 30. At this point, the valve would register the maximum pressure drop possible at a given flow rate for a given fluid across flow leg 12. To adjust the pressure drop to a lower desired level, the on-off liquid valve 17 is then closed, as is bleeder valve 19. Bleeder valve 20 is opened and the on-off liquid valve 16 is carefully opened, with the gate means 22 remaining open. This allows partial displacement of the solid shapes 29 into the storage leg 13 and reduces the length of packing in the flow leg 12. This is done gradually until the desired pressure drop is achieved at which point the solids blocking gate means 22 is closed to maintain the desired length of packing of the solid shapes within the storage leg 13.

To save space in the assembly of such valves, the flow leg and storage leg can be made of stacked coils as illustrated in FIGURE 2 in which the conduit legs are coils 38 and 39 and two 3-way valves 40 and 41 have been substituted for the four-valve system comprising the diverting valving means 15 of FIGURE 1.

As will be apparent to those skilled in the art, various mechanical equivalents are available for use as fluid diverting means 15 at the inlet and for the discharge manifold 21. As illustrated in FIGURE 2, the functions of the bleeder valve 19 and the on-off liquid valve can be combined into one three-way valve. Similarly, the gate means 22 for preventing the displacement of solid shapes within the conduit legs may take various forms. For example, solid gates may be positioned immediately adjacent, and on each side of, the discharge passage 24 in the manifold 21 to keep the solid shapes away from the discharge passage 24.

In selecting a particular solid shape to function as the pressure reducing, displaceable packing, care must be exercised to obtain shapes which are readily displaced under the operating conditions for the valve. To illustrate, it has been found with the use of solid shapes in the form of spheres, that efficient displacement under liquid pressure is obtained at sphere to tube diameter ratios of less than 0.33 and greater than 0.6. Within the range from 0.33 to 0.6 certain ratios will also work (i.e. the shapes will be pressure displaceable) at diameter ratios of about 0.4 and about 0.54. These ratios will, of course, vary with the particular solid shape used. Because of their symmetry, spheres are preferred, but any solid shapes may be used as the packing, which can be displaced under liquid pressure from one conduit leg to another. Moreover, any size of solid shapes may be used. This includes relatively small particulate matter such as sand, up to relatively large spheres which may nearly occupy the inside diameter of the tube. It follows that the upstream solid shape restraining means and the similar restraining means in the discharge passage of the outlet manifold will require appropriate modification to effectively maintain such a variety of solid shapes within the conduit legs during operation.

Materials of construction include any liquid conduits of convenience. Copper tubing and rubber tubing are used because of their easy adaptability to the form of coils. The solid shapes contained within the conduit legs may be of any solid material insoluble in the liquid on which the pressure is to be reduced. Glass beads or marbles as well as various plastic balls have been used successfully for this purpose.

The operating characteristics of valves prepared in accordance with the invention will vary according to the inside diameter of the pipe and size of the displaceable solid shapes, the length of the conduit leg containing a packing of such shapes and the liquid flow rate. For instance, a one inch pipe with the packing of one-half inch marbles for 47 feet produced pressure drops per linear foot of packing equal to 10 pounds, 20 pounds and 37 pounds at flow rates respectively of 9, 14 and 26 gallons per minute. A higher pressure gradient was achieved utilizing a one-half inch pipe containing three-eighths inch nylon balls for 20 feet of packing. Pressure drops of 10 and 20 pounds per square inch per linear foot of packing were achieved at flow rates of approximately 3.6 and 5.3 gallons per minute.

What is claimed is:

1. A valve for reducing pressure on a flowing liquid comprising a plurality of conduit legs, at least one of which contains a packing of pressure displaceable solid shapes, said conduits being connected in parallel to inlet valving means for either diverting liquid into or bleeding liquid from a given conduit, depending upon the function selected, and, at their other end, said conduits communicating through a discharge manifold to permit the passage of the pressure displaceable solid shapes from one conduit leg into another, said discharge manifold having gate means to block and unblock the passage of the solid shapes and an outlet passage in which there is a liquid permeable member to retain the displaceable solid shapes within the communicating passages of the conduit legs.

2. An apparatus as in claim 1 and including, on the upstream end, means to restrain the displaceable solid shapes.

3. An apparatus as in claim 1 wherein the inlet diverting valving means for each conduit comprises a three-way valve between the liquid inlet, the inlet to the conduit leg and a bleeder vent.

4. An apparatus as in claim 1 and including a shut-off valve on the outlet passage to the discharge manifold.

5. An apparatus as in claim 1 comprising two conduit legs in which collectively there are sufficient solid spheres to fill one conduit leg.

6. An apparatus as in claim 3 wherein the ratio of the diameter of the spheres to the inside diameter of the conduit legs is less than about 0.33 or more than about 0.54.

7. An apparatus as in claim 1 wherein the conduit legs take the shape of stacked coils.

References Cited

UNITED STATES PATENTS 2,090,727   8/1937   Gosman.
3,013,583   12/1961   Stanley _____ 138—43

ROBERT G. NILSON, Primary Examiner

U.S. Cl. X.R.

138—43